United States Patent
De Bart et al.

(10) Patent No.: US 7,551,691 B2
(45) Date of Patent: Jun. 23, 2009

(54) RECEIVER FOR A MULTI-CARRIER COMMUNICATION SYSTEM

(75) Inventors: Abraham Jan De Bart, Beijing (CN); Edwin Robert Dilling, Nijmegen (NL)

(73) Assignee: NXP B.V., Eindhoven (NL)

( * ) Notice: Subject to any disclaimer, the term of this patent is extended or adjusted under 35 U.S.C. 154(b) by 626 days.

(21) Appl. No.: 10/559,362

(22) PCT Filed: Jun. 1, 2004

(86) PCT No.: PCT/IB2004/050809

§ 371 (c)(1),
(2), (4) Date: Dec. 6, 2005

(87) PCT Pub. No.: WO2004/110002

PCT Pub. Date: Dec. 16, 2004

(65) Prior Publication Data

US 2006/0120267 A1  Jun. 8, 2006

(30) Foreign Application Priority Data

Jun. 11, 2003  (EP)  ................................. 03101694

(51) Int. Cl.
*H04L 27/00* (2006.01)
(52) U.S. Cl. ...................................................... 375/326
(58) Field of Classification Search ................. 375/326, 375/316, 322, 324
See application file for complete search history.

(56) References Cited

U.S. PATENT DOCUMENTS

| 6,370,188 | B1 | 4/2002 | Wu et al. |
| 7,016,651 | B1* | 3/2006 | Narasimhan ............. 455/67.11 |
| 7,161,896 | B1* | 1/2007 | Hart et al. .................... 370/206 |
| 2002/0146063 | A1* | 10/2002 | Gorokhov et al. ........... 375/148 |
| 2004/0066773 | A1* | 4/2004 | Sun et al. ..................... 370/343 |
| 2004/0156309 | A1* | 8/2004 | Chadha et al. .............. 370/208 |

FOREIGN PATENT DOCUMENTS

EP  0 683 576 A1  11/1995

OTHER PUBLICATIONS

"OFDM: An Old Idea Solves New Problems", International Symposium on Theoretical Engineering (ISTET, Austria, 2001), of Karl-Dirk Kammeyer, et al.

* cited by examiner

Primary Examiner—Kevin M Burd

(57) ABSTRACT

A receiver for a multi-carrier communication system has a channel corrector (173) which receives an input signal (CDC2) and a correction control signal (EC) to correct an amplitude and/or phase of the input signal (CDC2) to obtain a corrected signal (ED). A channel estimator (19) has a slicer (190) which performs a hard-decision on the corrected signal (ED) to obtain a decided signal (HDS). The correction control signal (EC) is dependent on a difference between the input signal (CDC2) and the decided signal (HDS) to decrease said difference.

9 Claims, 4 Drawing Sheets

RECEIVER FOR A MULTI-CARRIER COMMUNICATION SYSTEM

The invention relates to a receiver for a communication system based on a multi-carrier technique for transmitting information. Such a multi-carrier technique is for example OFDM (Orthogonal Frequency Division Multiplexing) which, for example, is applied in DAB (Digital Audio Broadcasting), DVB (Digital Video Broadcasting) and in indoor communication concepts like HiperLAN/2 and IEEE802.11a. Multi-carrier solutions are also introduced in ADSL (Asymmetric Digital Subscriber Line) and HDSL (High-Speed Digital Subscriber Line) where it is referred to as DMT (Discrete Multi Tone).

The invention further relates to a method of receiving a multi-carrier modulated signal, a multi-carrier communication system comprising such a receiver, and a wireless multi-carrier communication system comprising such a receiver.

The publication "OFDM: An Old Idea Solves New Problems", International Symposium on Theoretical Engineering (ISTET, Austria, 2001), of Karl-Dirk Kammeyer, et al. discloses an OFDM technique. An OFDM transmitter transmits a high frequent multi-carrier signal in which the carriers are quadrature amplitude modulated (QAM).

In QAM systems, on each of the carrier a complex signal is modulated. The complex signal comprises an I and a Q component which are quadrature modulated on the associated carrier. If, for example, both the I and the Q signal have 8 possible amplitudes, on each carrier 64 possible constellations can be modulated which each represent a six bit word.

The publication further discloses that the WLAN standards HiperLAN/2 and IEEE802.11a provide information bursts which each comprise a preamble in front of a data burst which contains data symbols. The preamble comprises a synchronization sequence of 8 μs followed by two identical training symbols of each 3.2 μs which are protected by one long guard interval of 1.6 μs. The data burst comprises user data of 432 bit/packet. Each data symbol contains 48 data carriers and 4 pilot carriers. The pilot carriers transmitted during the 2 training symbols and the pilot carriers transmitted during the data symbols have well known characteristics. The synchronization sequence is used in the receiver to control the AGC (Automatic Gain Control), carrier frequency estimation, and FFT (Fast Fourier Transform) window estimation. The training symbols are used to estimate the frequency response of the channel and initialize the equalizer which corrects for amplitude and phase distortion of the transmitted signal in the channel. The behavior of the channel is defined by channel coefficients. The training symbols are also used to obtain a more precise carrier frequency estimation. The pilot carriers are used for fine frequency tuning to correct for small synchronization errors.

In case of time variant channel coefficients, the initial channel estimation based on the training symbols suffices only near the beginning of the burst. The only 4 pilot carriers of the data symbols are not sufficient to supply channel tracking for a complete sub-carrier coefficient set.

The publication further discloses that in order to create additional training symbols, received and decided data can be re-modulated to re-estimate the channel coefficients during data demodulation.

It is an object of the invention to provide a multi-carrier communication receiver which can cope with time variant channel coefficients during a data frame, but which uses a less complex channel estimate.

This object is reached by the receiver for a multi-carrier communication system, which receiver comprises: a channel corrector for receiving an input signal and a correction control signal to correct an amplitude and/or phase of the input signal to obtain a corrected signal, and a channel estimator comprising a slicer for performing a hard-decision on the corrected signal to obtain a decided signal, the correction control signal being dependent on a difference between the input signal and the decided signal to decrease said difference.

This object is also reached by a method of receiving a multi-carrier carrier modulated signal, which method comprises the step of channel correcting which receives an input signal and a correction control signal to correct an amplitude and/or phase of the input signal to obtain a corrected signal, and the step of channel estimation which performs a hard-decision on the corrected signal to obtain a decided signal, the correction control signal being dependent on a difference between the input signal and the decided signal to decrease said difference.

The object of the invention is further reached by a multi-carrier communication system comprising such a receiver, and by a wireless multi-carrier communication system comprising such a receiver, wherein said system comprises a transmitter for transmitting a modulated multi-carrier high frequent signal via air, and the receive comprises means for receiving said high frequent signal.

In a channel with frequency selective fading, different carrier frequencies suffer from different attenuations and different phase shifts. The receiver needs to make an estimate of these distortions per carrier, and to correct them before the phase and the amplitude of the carriers can be demapped to bits. Usually, the channel estimator uses the two long training symbols to make an estimate of the phase and amplitude distortion of each of the data carriers. The channel estimator supplies a correction control signal to a channel corrector. The channel corrector is inserted in the signal path to correct the amplitude and/or phase of the input signal of the channel corrector to obtain a corrected signal.

The channel estimate will not be fully accurate, for example, due to additive noise or due to changing channel characteristics. For short frames, the channel characteristics can be assumed static. However, for long frames, the channel characteristics may change in time. The channel estimator in accordance with an aspect of the invention uses the corrected signal which comprises the equalized carriers of the data symbols to update the channel estimate during the data symbols. For at least one data carrier, but preferably all data carriers, the difference between the input signal of the channel corrector and the output signal (the decided signal) of the slicer is determined to control the channel corrector with the correction control signal to decrease this difference.

Because the channel corrector is controlled by an offset found between the input signal of the channel corrector and the output signal of the slicer to decrease this offset, changing channel characteristics during a frame will be corrected. In fact, the input signal of the channel corrector is a representation of the received phase and amplitude of a data carrier, and the output signal of the slicer is a representation of the phase and amplitude of this data carrier as it is most probably transmitted. Thus, if is detected that still a phase or amplitude error is present between the input signal of the channel corrector and the output signal of the slicer, most probably, the channel characteristics have changed. These changed channel characteristics can be compensated by adapting the channel corrector (also referred to as equalizer, although the equalizer may comprise other circuits) according to the difference detected. This process can be applied on each one of the data carriers.

EP-A1-0683576 discloses an OFDM digital broadcasting system which comprises a transmitter and a receiver. The transmitter transmits OFDM signals. OFDM is a modulation method which uses plural frequencies selected orthogonal with respect to each other with frequency intervals 1/NT. The frequency interval is equal to 1/OFDM symbol period. The symbol period is equal to N times the sample period T, wherein N is the number of points in the FFT. At least one transmission symbol period comprises successively a guard interval and an effective symbol period. The transmitter further transmits a pilot signal at fixed time intervals. The pilot signal comprises two or more frequencies selected from the plurality of frequencies. The receiver comprises an estimation of the timing period offset, timing phase offset, frequency offset and phase offset using the received signal at the FFT (Fast Fourier Transformation) output. A frequency/phase correction controller and/or a sampling timing period/phase controller use the estimated values to acquire the correct timing and/or frequency synchronization.

The timing and/or frequency synchronization may be obtained by using the phase difference between the signal at the output of the FFT (the received signal) and the signal decided by the hard judgment circuit which is a slicer.

In a first embodiment, the receiver comprises an interpolator and a frequency/phase correction controller which together control a derotator based on the frequency/phase estimation performed on the output signal of the FFT. The derotator is positioned before the FFT. The frequency/phase estimation uses the received pilot signals to estimate the frequency/phase. The interpolator is controlled by a sampling timing controller which also uses the received pilot signals. This embodiment does not correct the effect of changing channel characteristics by using the difference between the FFT-ed signal and a sliced signal.

In a second embodiment, again the frequency/phase estimation is performed using the FFT output signals. The frequency/phase estimator controls a frequency/phase controller to acquire the correct demodulation of the I and Q signal by correcting the mixer signals in the time domain. The frequency/phase estimator controls a sampling timing controller to correct for clock timing errors by directly influencing the clocks of the I and Q analog to digital converters (also referred to as ADC's) via a phase locked loop. The frequency/phase estimator uses the frame synchronization symbol and the training symbols which are referred to as pilot symbol preceding the data symbols. If these corrections are performed, the output signal of the FFT will show relatively small phase errors. The slicer which makes a hard-judgment uses the output signal of the FFT to decide on which complex number in most likely received. The difference of the phase errors between the received demodulated and FFT-ed signal and the hard-judged signal include only the sampling time errors. The PLL is controlled by this difference such that it becomes zero. This correction is possible while symbols other than the frame synchronization symbol and the training symbol are received.

Thus, although EP-A1-0683576 comprises a slicer, the difference between its input signal and the output signal is used to control a PLL to correct the clock timing error. In an aspect in accordance with the invention, the difference between the input signal of the channel corrector and the output signal of the slicer is used to control the channel corrector such that the amplitude and/or phase of the received signal are corrected for the difference detected. The clock timing is not influenced. This will improve the quality of the decoding operation. Although is referred to the input signal of the channel corrector any other FFT-ed signal before the channel corrector can be used to be compared with the hard judged signal outputted by the slicer. Preferably, this FFT-ed signal is corrected for the common amplitude error, the common phase error and the differential phase error.

In an embodiment in accordance with the invention, in the receiver for the multi-carrier communication system, the channel estimator further comprises an initial estimator for determining an initial estimate of the correction signal based on pilot symbols in the input signal, a comparing circuit for comparing the corrected signal with the decided signal to obtain a difference signal, and a filter for weighting the difference signal and the initial estimate.

The initial estimator is a well known estimator based on using the pilot symbols to obtain an initial estimation of the channel characteristics which are able to correct for these channel characteristics via the channel corrector as long as the channel characteristics can be considered to be constant for a complete frame. To cope for channel characteristics which change during the frame, the input signal of the channel corrector and the output signal of the slicer are compared to detect a difference between the received phase and amplitude of a particular data carrier and the most probably transmitted phase and amplitude (the constellation point) of this data carrier. However, due to, for example, noise, in successive frames, for the same particular data carrier this difference may differ considerably. Therefore, preferably, the difference determined for the particular data carrier is not used directly to compensate for the phase and amplitude difference of this particular data carrier, but a filter is used which weights the difference and the initial estimation. It is also possible to low-pass filter, in successive data symbols, the difference determined for a same carrier.

These and other aspects of the invention are apparent from and will be elucidated with reference to the embodiments described hereinafter.

In the drawings:

FIG. 1 shows a data frame as prescribed in the IEEE802.11a standard. The data frame DF comprises a preamble PR and data symbols DS.

The preamble PR comprises 10 short symbols t1 to t10, which together have a duration of 2 data symbols DS. The preamble PR further comprises two training symbols T1 and T2 with each a duration equal to the duration of the data symbols DS. A guard interval GI2 precedes the two training symbols T1 and T2. The short symbols t1 to t10 are used for signal detection, AGC, carrier frequency estimation (coarse frequency offset estimation) and FFT window positioning (timing synchronization). The two training symbols T1 and T2 are fixed, identical and BPSK (Binary Phase Shift Keying) modulated and are used to estimate the frequency response of the channel and to initialize the equalizer (channel estimation and fine frequency offset estimation). A HiperLAN/2 compliant frame has a similar preamble of 16 μs.

The training symbols T1 and T2 are followed by the signal symbol SI which contains information for the receiver, and the data symbols DS which contain the data D1, D2, . . . , each of these symbols is preceded by a guard interval GI. Each data symbol DS comprises four pilot carriers PC (see FIG. 2) which can be used to update the equalizer and to correct for small synchronization errors.

Figure 2:
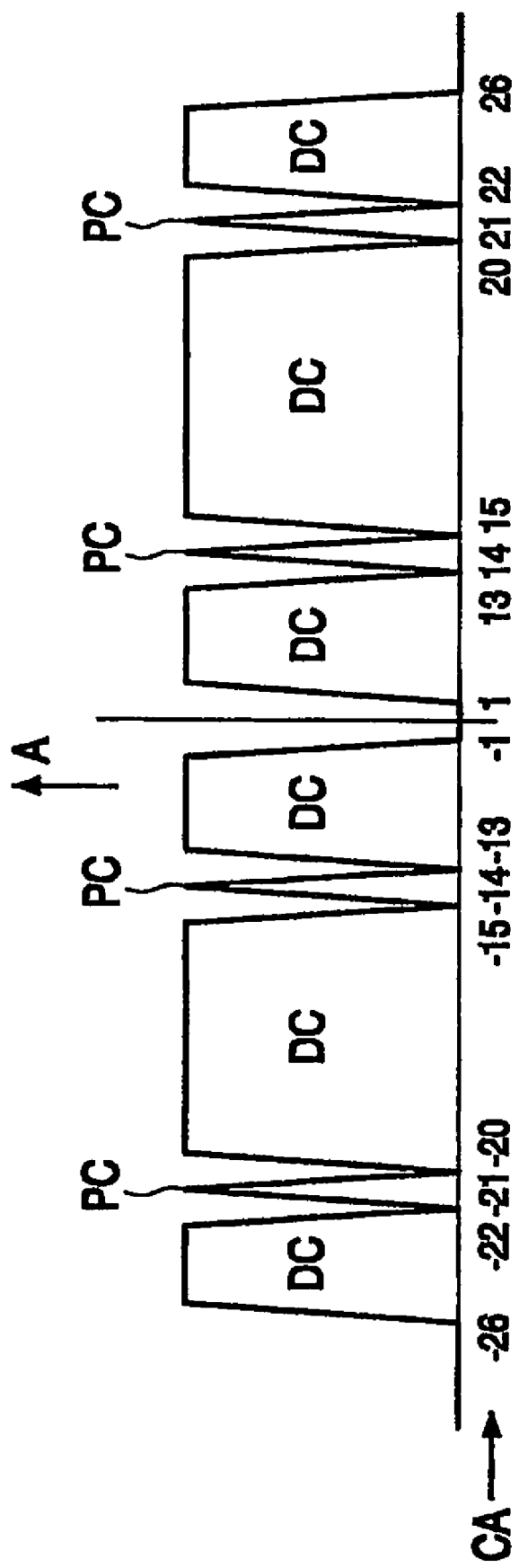
FIG. 2 shows a distribution of carriers in data symbols.

FIG. 2 shows a distribution of carriers in data symbols. In both the IEEE802.11a and the HiperLAN/2 standard, the OFDM technique is used wherein 52 carriers CA (indexed from −26 to +26 excluding 0) are modulated with a carrier interval of 312.5 kHz. The 4 pilot carriers PC occur at the fixed carrier positions −21, −14, 14 and 21 and are BPSK modulated. The 48 data carriers DC occur at the carriers CA not occupied by the pilot carriers PC. The data carriers DC may be BPSK, QPSK, 16-QAM or 64-QAM modulated. The zero carrier is not modulated. In FIG. 2, the horizontal axis represents the frequency and the vertical axis represents the amplitude A of the carriers CA.

Figure 3:
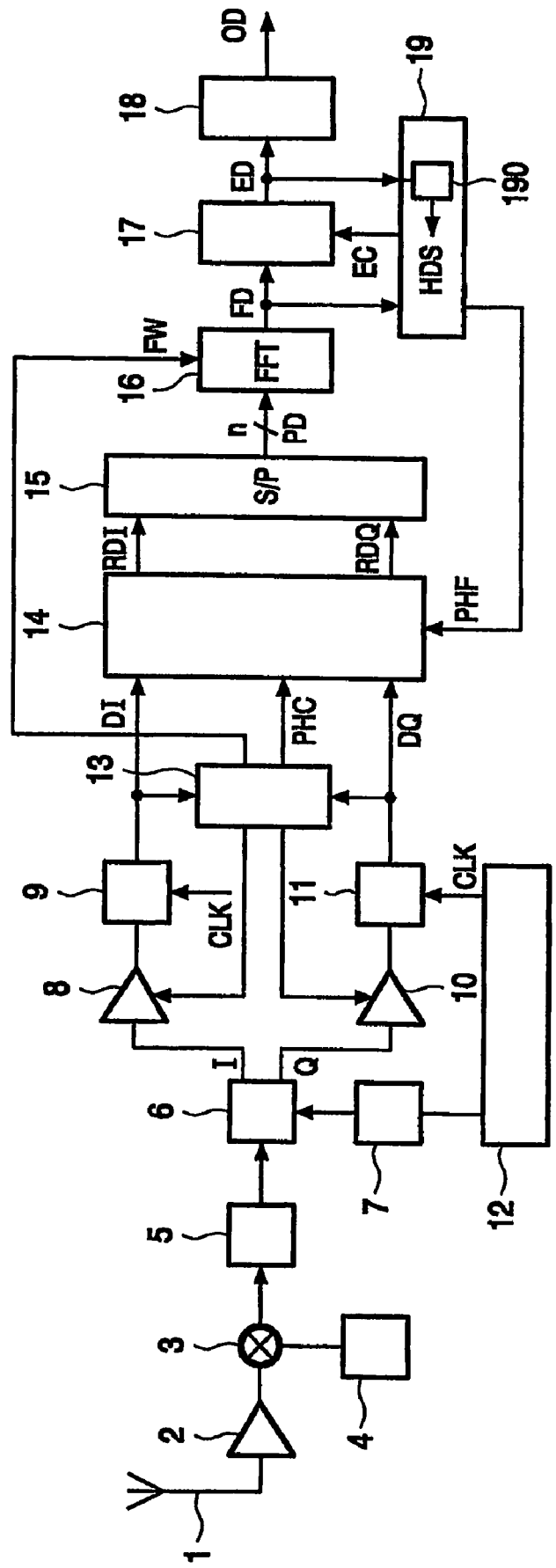
FIG. 3 shows a block diagram of a multi-carrier communication system.

FIG. 3 shows a block diagram of a multi-carrier communication system. Before discussing the circuits of FIG. 3 in detail, first the known problems of a multi-carrier transmission system are addressed.

Each symbol t1 to t10, T1, T2, SI, DS comprises a plurality of carriers CA which have a relatively small frequency offset with respect to each other. On each of the carriers CA complex data is modulated which is present during the duration of the symbol. For example, the data is modulated by using 64-QAM which provides 64 constellation points which are discrete data values obtained by discrete combinations of the I and Q components of the data. Usually, the plurality of carriers CA is modulated on a high frequent signal to be transmitted by air or cable.

Usually, a frame DF which is transmitted by air, will be heavily distorted when it reaches the receiver. The signal transmitted by the transmitter is distorted in the channel between the transmitter and the receiver. Especially in an indoor environment, usually echoes occur which causes the channel to fade frequency selective. Further, the transmitted signal will be deteriorated by noise added in the channel and in the receiver. The analogue front-end of the receiver introduces carrier and sampling clock frequency errors and gain errors. Consequently, different carriers CA at the different carrier frequencies suffer from different attenuations and different phase shifts. As an OFDM modulated signal uses a wide range of carrier frequencies, the receiver needs to estimate these distortions per carrier CA. The receiver uses the estimate per carrier CA to correct the carrier CA for these errors before the carrier CA is demodulated or demapped into bits. Usually this correction is implementation after the FFT and referred to as equalization in the frequency domain. For short frames DF, the channel characteristics may be considered to be constant, for long frames, the channel characteristics may change over time.

The transmitted signal which reaches the antenna 1 of the receiver after traveling through the channel may be strongly attenuated. The RF front-end 1 to 12 of the receiver down-converts the antenna signal to a baseband signal and provides an AGC function 8, 10 to optimally use the input range of the ADC's 9, 11. The RF front-end may add a considerable amount of noise. The AGC is controlled during the short training symbols t1 to t10. The value of the AGC will not be changed during the training symbols T1 and T2 and during the data symbols DS. Thus, the amplification factor of the front-end should be fixed during these last mentioned symbols. However, due to time constants in the AGC loop and switching effects, amplitude variations on all the carriers CA may occur which are common for all carriers CA and is referred to as common amplitude error CAE. The amplitude of the carriers CA may also be influenced by changing channel characteristics, for example due to an obstruction of the line of sight between the transmitter and the receiver.

The equalizer 17 in the receiver should take all these effects into account to obtain an optimal performance and to provide the best possible input to the demapper 18 which uses the phase and amplitude of the carrier received to be able to recover the bit value modulated on this carrier CA.

The short training symbols t1 to t10 are used to estimate the high frequent carrier frequency. This estimate may not be perfect and a residual carrier frequency error may remain. The carrier frequency error will be present on all carriers in the OFDM signal. After the FFT this is visible as a phase error on all OFDM symbols, and the phase error will increase or decrease (depending on the sign of the carrier frequency error) with each OFDM symbol. After the FFT, this phase jump is still the same and is present on all carriers CA and therefore referred to as the common phase error CPE. The absolute value of the common phase error CPE depends on the starting phase of the carrier frequency error. Thus, during demodulation, the common phase error CPE on the first OFDM symbol will have a predetermined value determined by the phase of the frequency error. Once the first common phase error CPE is known, the next common phase error CPE, which is a function of the frequency error, can be calculated. Assuming a frequency error of about one percent of the carrier spacing, the maximum common phase error CPE jump from symbol to symbol is about 0.0785 radians.

Timing errors in the sampling clock CLK of the ADC's 9, 11 also lead to phase errors on the carriers of an OFDM symbol. The timing errors cause phase errors which linearly increase or decrease with the carrier index and are therefore often referred to as differential phase errors DPE. A static timing error causes the FFT window to not exactly start at the start of the OFDM symbol and leads to a phase shift of the carrier CA that is proportional to its index. Thus, if the carrier indicated by index 1 has no phase shift and the carrier with index 2 has a phase shift of k degrees, then the carrier indicated by index 3 will have a phase shift of 2 k degrees. A clock frequency error causes a timing error which increases or decreases for each OFDM symbol. Thus, if in the first OFDM symbol the phase jump between two successive carriers CA is k degrees, then in the next OFDM symbol the phase jump between two successive carriers CA is smaller or larger than k degrees. Note that for IEEE802.11a and HiperLAN/2 the sampling clock CLK may be locked to the clock which generates the carrier frequency. In order to reduce the number of components in the receiver, it is possible to use a single crystal for both the clock frequency reference and the carrier frequency reference.

Figure 1:
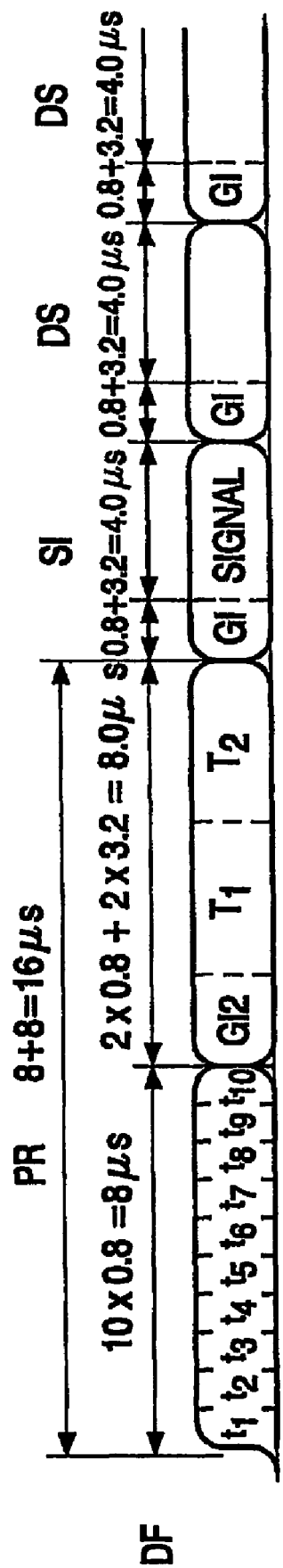
FIG. 1 shows a data frame as prescribed in the EEE802.11a standard.

Now, the transmitter shown in FIG. 3 will be elucidated. The well known OFDM transmitter is not shown. The OFDM transmitter provides burst of frames DF, for example as elucidated with respect to FIG. 1.

The OFDM receiver comprises an antenna 1 to receive the high frequent signal and a high-frequency amplifier 2 which amplifies the high frequent signal. A frequency converter 3, which usually is a mixer, receives both the high frequent signal supplied by the amplifier 2 and an oscillator signal from the local oscillator 4 to obtain an intermediate frequency signal which is supplied to the I/Q demodulator 6 via the band-pass filter 5. The I/Q demodulator 6 supplies the base band I and Q signals which represent the components of the complex data signal modulated on the one of the data carriers DC of one of the data symeblosDS. The I/Q demodulator 6 receives an oscillator frequency from the fixed frequency oscillator 7. For example, the high frequent signal may be approximately 5 GHz, the local oscillator 4 may supply approximately 3.1 GHz such that an intermediate frequency of approximately 1.9 GHz results. The local oscillator 4 may be tunable to tune to the desired signal channel to be received. The fixed oscillator 7 supplies a frequency of approximately 1.9 GHz.

The signal I is supplied to the ADC 9 via the AGC circuit 8 to obtain a digital representation DI of the analog signal I. The signal Q is supplied to the ADC 11 via the AGC circuit 10 to obtain a digital representation DQ of the signal Q. A synchronization unit 13 receives the digital signals DI and DQ and uses the short symbols t1 to t10 to control the AGC circuits 8 and 10. The clock signals CLK for the ADC 9 and 11 and the fixed frequency oscillator 7 signal may originate from the same crystal oscillator 12.

The digital signals DI and DQ are supplied to a derotator 14 which supplies phase rotated signal RDI and RDQ. For example, the derotator 14 multiplies the complex signal I+jQ with a correction phase A, and thus supplies (I+jQ)jφ). The phase rotation provided by the derotator 14 depends on a coarse phase correction signal PHC and may depend on a fine phase correction signal PHF. The coarse phase correction signal PHC is determined by the synchronization circuit 13 from the training symbols t1 to t10 and T1, T2. The generation of the fine phase correction signal PHF will be discussed later. The serial signals RDI and RDQ are converted into parallel signals PD by the serial to parallel converter 15. In fact, in the serial to parallel converter 15 sufficient samples are collected in time to be able to perform the FFT operation 16. The guard interval is stripped here as well. The start instant of the FFT is based on the short training symbols t1 to t10. In case of IEEE802.11a 64out of 80 samples are used in the FFT. The FFT processor 16 further receives information FW on the FFT window position from the synchronization unit 13. The FFT-ed signal FD is supplied to the equalizer 17 to obtain equalized signals ED. The demapper 18 demaps the equalized signals ED into the output data bits OD.

The known channel estimator 19 receives the FFT-ed signal FD and evaluates the four pilot carriers PC in the data symbols DS to obtain the phase and amplitude errors between these received pilots and the expected pilots. In the receiver shown in FIG. 3, the detected phase errors are shown to be the fine phase correction signal PHF which are fed to the derotator 14. The amplitude errors are corrected in the equalizer 17. It is also possible to correct for the phase errors in the equalizer 17 as is elucidated with respect to FIG. 4.

In an embodiment in accordance with the invention, the channel estimator 19 comprises a slicer or hard-decision unit 190. The slicer 190 demaps the received carrier CA to the nearest constellation point. This means that the slicer 190, based on the input signal ED which is the FFT-ed signal, takes a hard decision on which constellation point is most probably transmitted.

Thus, now, the channel estimator 19 also receives the input signal ED. The difference in phase and amplitude between the received carrier, for example in the FFT-ed signal FD, and the decided on carrier HDS which has the phase and amplitude of the constellation point decided on is used. The phase difference may be corrected in the derotator 14 or in the equalizer 17. The amplitude difference may be corrected in the equalizer 17.

Figure 4:
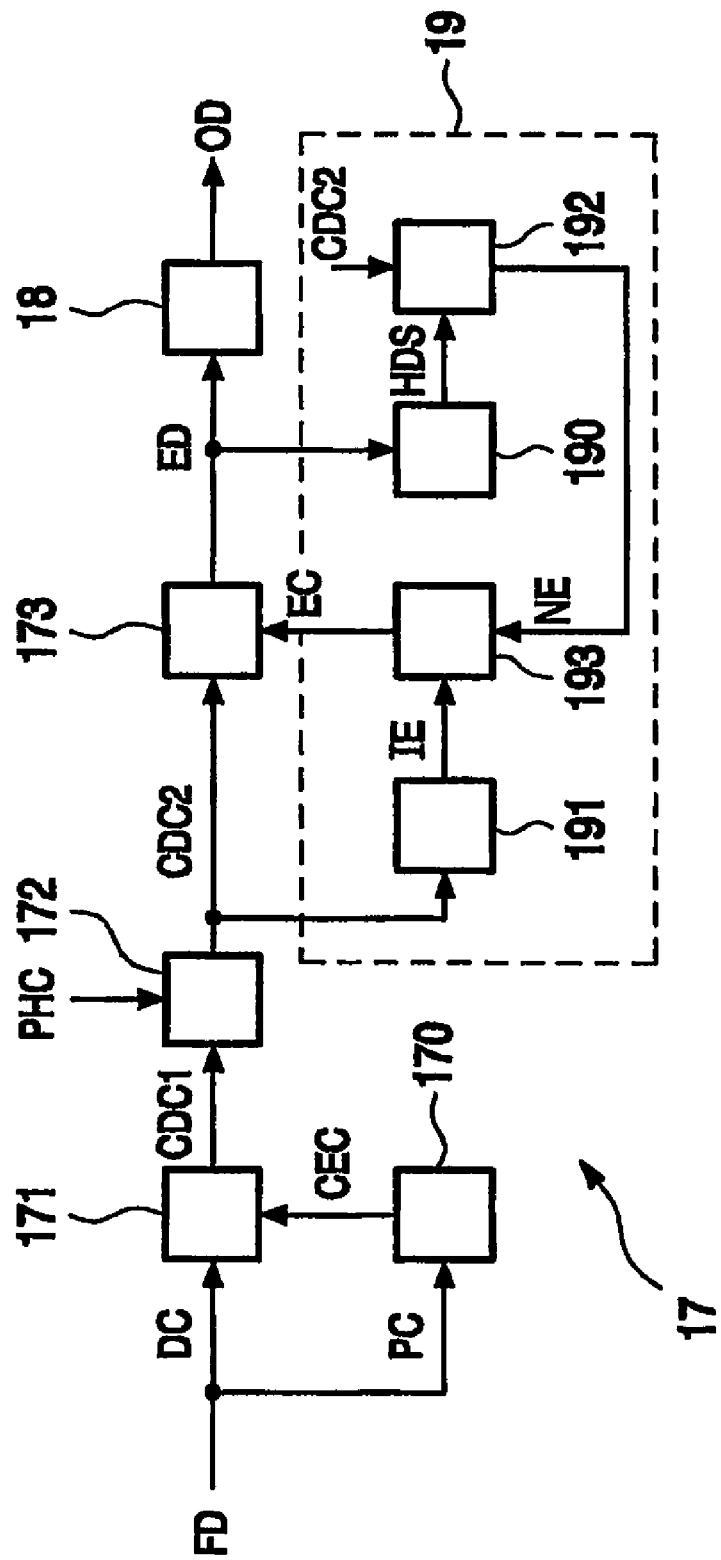
FIG. 4 shows a block diagram of the equalizer in accordance with an embodiment of the invention.

FIG. 4 shows a block diagram of the equalizer 17 in accordance with an embodiment of the invention. The equalizer 17 as shown in FIG. 3 now comprises a CAE/CPE estimation unit 170 which receives the pilot carriers PC and supplies a control signal CEC to the CAE/CPE correction unit 171 which corrects the common phase error CPE and the common amplitude error CAE of the data carriers DC. The DPE correction unit 172 receives the corrected carriers CDC1 and a clock frequency error estimation. If in the transmitter a crystal is used to generate both the high frequency carrier and the clock CLK, the coarse frequency error estimate PHC from the synchronization unit 13 can be used to correct for the differential phase error DPE.

The channel corrector 173 receives the corrected carriers CDC2 from the DPE correction circuit 172 and supplies the input signal ED to the channel estimator 19 which comprises the slicer 190. The channel estimator 19 determines the control signal EC which controls the channel corrector 173. Usually, the channel estimator 19 only uses the corrected carriers CDC2 of the training symbols T1 and T2 to determine the control signal EC such that the phase and amplitude distortions caused by the channel are substantially compensated for during the complete frame DF. However, if the channel characteristics change during the frame DF, this correction will not be optimal. It is known to use the four pilot carriers PC to correct for changing channel characteristics. But the use of the four pilot carriers PC is not sufficient to provide channel tracking for a complete carrier coefficient set.

In a channel with frequency selective fading, different carriers CA will suffer from different attenuations and different phase shifts. The receiver needs to make an estimate of these distortions per carrier CA, and to correct for them before they can be demapped to bits. The channel estimator 19 comprises the well known original channel estimator 191 which uses the two training symbols T1 and T2 to estimate the phase and amplitude distortion of each of the carriers CA. This estimate is referred to as the initial estimate IE. Note that the original channel estimator 191 will not be fully accurate due to additive noise. For short frames, the channel characteristics can be assumed to be static, but for long frames, the channel characteristics may change over time. The equalizer 17 in accordance with an embodiment of the invention uses the equalized carriers ED and CDC2 to update the channel estimate during the data symbols DS. This update assures that the channel estimate stays correct, even if the channel conditions change during the reception of the frame DF. The channel update also improves the initial channel estimate IE based on the training symbols T1 and T2 if it was noisy.

The channel estimator 19 stores the phase distortion and the amplitude distortion as determined during the training symbols TI and T2 for each data carrier DC. The data carriers DC are provided to the channel correction unit 173 one by one, and the phase error and the amplitude error are removed by using the channel estimate EC for the data carriers DC one by one. After the channel correction unit 173, each data carrier DC should have the correct amplitude and phase, and is only distorted by additive noise. The output of the channel correction unit 173 is coupled to the demapper 18 and the input of the channel correction unit 173 is coupled to the slicer 190.

The slicer 190 demaps the carrier of each data symbol DS to the nearest constellation point HDS (i.e. the slicer 190 takes a hard decision). It is also possible to use the slicer of the demapper 18, if present. This hard decision HDS, which is interpreted as the transmitted carrier, is compared to the received carrier CDC2 (before the channel correction) in the comparator unit 192. The amplitude difference and the phase difference between the received carrier CDC2 and the decided transmitted carrier HDS is used as the new channel estimate NE. Usually, due to the distortions caused by the channel, the received carrier constellation point will usually not coincident with one of 64 constellation points which are modulated on the carrier in the transmitter. Thus, with the term received carrier constellation point is meant the amplitude and phase of this carrier as received.

This new channel estimate NE may be directly used for the same carrier CA of the next data symbol DS by controlling the channel correction unit 173 such that the received constellation point is corrected to become substantially equal to the hard decided constellation point. Thus, after this correction, at the input of the channel correction unit 173, the amplitude and phase of the carrier CA substantially equals the amplitude and phase of the constellation point which was decided on by the slicer 190.

However, it is better to not directly use the new channel estimate NE as the control signal EC of the channel correction unit 173, but to add a filter 193 which generates an updated channel estimate EC as a combination of the initial channel estimate IE and the new channel estimate NE. For example, the update channel estimate EC may be:

$$EC = \alpha NE - (1-\alpha) IE$$

wherein NE is the new channel estimate, and IE is the initial channel estimate. The initial channel estimate IE is the channel estimate made by the channel estimator 191 based on the training symbols T1 and T2. The optimal value of $\alpha$ depends on the signal to noise ratio in the channel. It is also possible to use another averaging algorithm or low pass filtering on one or more initial channel estimate(s) IE and the new channel estimate NE.

The use of the difference between the corrected signal (the received carrier constellation point) CDC2 and the output signal (the determined carrier constellation point) HDS of the slicer 190 to control the channel corrector 173 to substantially correct the amplitude and phase of this carrier CA such that the received carrier constellation point becomes more equal to the determined carrier constellation point does not require any changes to the well known slicer 190 and channel corrector 173. It is only required to add a new channel estimate circuit 192 which determines the difference between the received carrier constellation point and the determined constellation point to control the channel corrector 173 with or also with this difference. Preferably, the channel estimator 19 further comprises an averaging circuit 193 which averages the initial channel estimate IE with the new channel estimate NE.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A receiver for a multi-carrier communication system, the receiver comprising:
   a channel corrector for receiving an input signal and a correction control signal to correct an amplitude and a phase of the input signal to obtain a corrected signal, and a channel estimator comprising:
   a slicer for performing a hard-decision on the corrected signal to obtain a decided signal, the correction control signal being dependent on a difference between the input signal and the decided signal to decrease said difference;
   an initial estimator for estimating an initial estimate of the correction control signal based on pilot symbols in the input signal;
   a comparing circuit for comparing the input signal with the decided signal to obtain a difference signal; and
   a filter for weighting the difference signal and the initial estimate, wherein the filter is further configured to generate an updated channel estimate, the updated channel estimate being defined as:

$$EC = \alpha NE - (1-\alpha) IE,$$

where EC is the updated channel estimate, NE is the difference signal, IE is the initial estimate, and $\alpha$ is a predefined value.

2. A receiver for a multi-carrier communication system as claimed in claim 1, wherein the receiver further comprises a Fast Fourier Transform circuit for supplying the input signal, the input signal representing a phase and an amplitude of a particular received data carrier.

3. A receiver for a multi-carrier communication system as claimed in claim 1, wherein the channel estimator further comprises a comparing circuit for comparing the input signal with the decided signal to obtain a comparison signal, the correction control signal being dependent on said comparison signal.

4. A receiver for a multi-carrier communication system as claimed in claim 3, wherein the input signal represents a phase and an amplitude of a particular received data carrier and wherein the decided signal represents a phase and an amplitude of a transmitted carrier corresponding to the particular received data carrier, and wherein the comparing circuit compares the phase and the amplitude of the input signal with the phase and the amplitude of the decided signal, respectively, to obtain the correction control signal for controlling the channel corrector to correct the phase and the amplitude of the input signal.

5. A receiver for a multi-carrier communication system as claimed in claim 1, wherein the input signal represents a phase and an amplitude of a particular received data carrier and wherein the decided signal represents a phase and an amplitude of a transmitted carrier corresponding to the particular received data carrier.

6. A multi-carrier communication system comprising a receiver as claimed in claim 1.

7. A wireless multi-carrier communication system comprising a receiver as claimed in claim 1, wherein said system comprises a transmitter for transmitting a modulated multi-carrier high frequent signal via air, and the receiver comprises means for receiving said high frequent signal.

8. A receiver for a multi-carrier communication system as claimed in claim 1, wherein the channel estimator further comprises an averaging unit configured to average the initial estimate and the difference signal.

9. A method of receiving a multi-carrier carrier modulated signal, the method comprising:
   performing channel correcting, wherein performing channel correcting includes receiving an input signal and a correction control signal to correct an amplitude and a phase of the input signal to obtain a corrected signal, and
   performing channel estimation, wherein performing channel estimation includes:

performing a hard-decision on the corrected signal to obtain a decided signal, the correction control signal being dependent on a difference between the input signal and the decided signal to decrease said difference;

estimating an initial estimate of the correction control signal based on pilot symbols in the input signal;

comparing the input signal with the decided signal to obtain a difference signal; and weighting the difference signal and the initial estimate to generate an updated channel estimate, the updated channel estimate being defined as:

$$EC = \alpha NE - (1-\alpha)IE,$$

where EC is the updated channel estimate, NE is the difference signal, IE is the initial estimate, and $\alpha$ is a predefined value.

* * * * *